(12) United States Patent
Zhang

(10) Patent No.: US 9,229,478 B2
(45) Date of Patent: Jan. 5, 2016

(54) HOUSING AND ELECTRONIC DEVICE USING THE SAME

(71) Applicants: SHENZHEN FUTAIHONG PRECISION INDUSTRY CO., LTD., Shenzhen (CN); FIH (Hong Kong) Limited, Kowloon (HK)

(72) Inventor: Chun-Jie Zhang, Shenzhen (CN)

(73) Assignees: SHENZHEN FUTAIHONG PRECISION INDUSTRY CO., LTD., Shenzhen (CN); FIH (Hong Kong) Limited, Kowloon (HK)

(*) Notice: Subject to any disclaimer, the term of this patent is extended or adjusted under 35 U.S.C. 154(b) by 382 days.

(21) Appl. No.: 13/914,909

(22) Filed: Jun. 11, 2013

(65) Prior Publication Data

US 2014/0205775 A1    Jul. 24, 2014

(30) Foreign Application Priority Data

Jan. 23, 2013    (CN) .......................... 2013 1 0024416

(51) Int. Cl.
G06F 1/16    (2006.01)

(52) U.S. Cl.
CPC ............. *G06F 1/1626* (2013.01); *Y10T 428/13* (2015.01)

(58) Field of Classification Search
CPC ............................ G06F 1/1626; Y10T 428/13
See application file for complete search history.

(56) References Cited

U.S. PATENT DOCUMENTS 5,331,120 A * 7/1994 Fleischer ............. G10K 11/162
148/437

* cited by examiner

*Primary Examiner* — Michael C Miggins
(74) *Attorney, Agent, or Firm* — Novak Druce Connolly Bove + Quigg LLP

(57) ABSTRACT

A housing includes a substrate, a transition layer disposed on the substrate, and a color layer disposed on the transition layer. The transition layer is a mixing coating layer of metal carbonitride. The metal contains titanium and one of which selected from the group consisting of aluminum, chromium, and iron. The color layer is a titanium-chromium-aluminum layer. An electronic device using the housing is also described.

20 Claims, 3 Drawing Sheets

HOUSING AND ELECTRONIC DEVICE USING THE SAME

CROSS-REFERENCE TO RELATED APPLICATIONS

This application is related to the U.S. patent applications listed below. The current application and the related application have the same assignee. The disclosure of each of the applications is incorporated by reference into the other application.

|  | Title | Inventors |
|---|---|---|
| 13/914,921 | HOUSING AND ELECTRONIC DEVICE USING THE SAME | CHUN-JIE ZHANG |
| 13/914,923 | HOUSING AND ELECTRONIC DEVICE USING THE SAME | CHUN-JIE ZHANG |

BACKGROUND

1. Technical Field

The present disclosure relates to housings, especially to a housing having high hardness and an enamel appearance, and an electronic device using the housing.

2. Description of Related Art

Housings of electronic devices may be decorated by white paint. However, the paint coating is thick, has low light transmittance and low glossiness, and thus cannot present an enamel appearance. Furthermore, the paint coatings are typically soft and prone to abrasion.

Therefore, there is room for improvement within the art.

BRIEF DESCRIPTION OF THE DRAWING

Many aspects of the disclosure can be better understood with reference to the following figure. The components in the figure are not necessarily drawn to scale, the emphasis instead being placed upon clearly illustrating the principles of the disclosure. Moreover, in the drawings like reference numerals designate corresponding parts throughout the several views.

DETAILED DESCRIPTION

Figure 1:
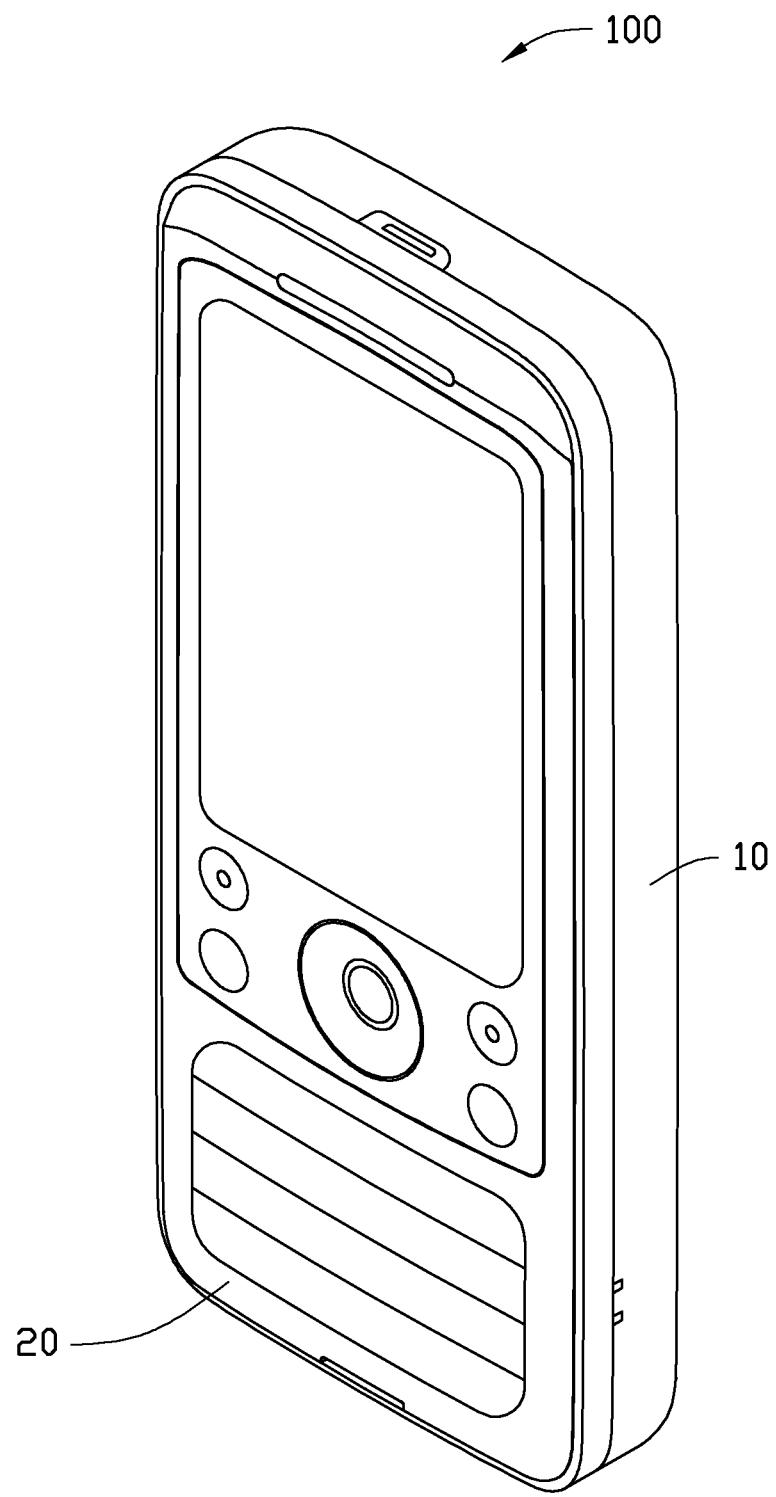
FIG. 1 is a schematic view of an electronic device in accordance with an exemplary embodiment.

FIG. 1 shows an electronic device 100 according to an exemplary embodiment. The electronic device 100 may be a mobile phone, a PDA, a notebook computer, for example. The exemplary embodiment uses a mobile phone as an example to describe the electronic device 100.

The electronic device 100 includes a housing 10, and a main body 20. The housing 10 is configured to assemble with the main body 20. Electrical elements and a displaying assembly (not shown) can be received in the main body 20.

Figure 2:
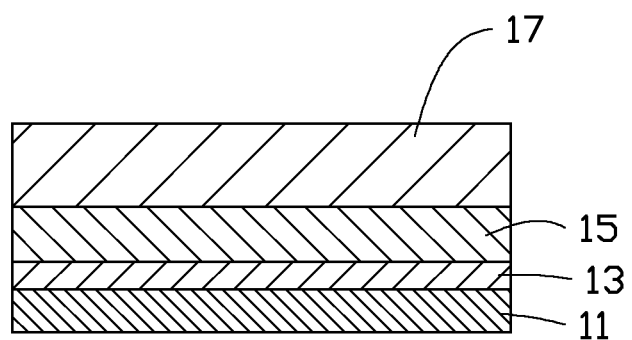
FIG. 2 is a partial cross-sectional view of a housing in accordance with an exemplary embodiment.

Referring to FIG. 2, the housing 10 includes a substrate 11, a base layer 13 formed on the substrate 11, a transition layer 15 formed on the base layer 13, and a color layer 17 formed on the transition layer 15.

The substrate 11 can be made of aluminum, aluminum alloy, or stainless steel.

The base layer 13 is made of metal. The metal may be titanium, chromium, or iron. The base layer 13 has a thickness ranging from about 0.5 micrometers (μm) to about 0.8 μm. The base layer 13 firmly bonds the transition layer 15 to the substrate 11.

The transition layer 15 is a mixing coating layer made of first and second metal carbonitrides. The first metal carbonitride typically includes titanium carbonitrade. The second metal carbonitride typically includes one of the following: aluminum carbonitride, chromium carbonitride, and iron carbonitride. In the transition layer 15, the titanium carbonitride has a mass percentage of about 60% to about 80%, the aluminum carbonitride, the chromium carbonitride, or the iron carbonitride has a mass percentage of about 20% to about 40%. When the transition layer 15 includes titanium carbonitride and aluminum carbonitride, the titanium carbonitride has a mass percentage of about 80%, and the aluminum carbonitride has a mass percentage of about 20%. When the transition layer 15 includes titanium carbonitride and chromium carbonitride, the titanium carbonitride has a mass percentage of about 65%, and the chromium carbonitride has a mass percentage of about 35%. When the transition layer 15 includes titanium carbonitride and iron carbonitride, the titanium carbonitride has a mass percentage of about 70%, and the iron carbonitride has a mass percentage of about 30%. The transition layer 15 has a thickness ranging from about 1 μm to about 4 μm. The transition layer 15 has a high hardness, which enhances the hardness of the housing 10.

The color layer 17 is a titanium-chromium-aluminum layer. In the color layer 17, the titanium has a mass percentage of about 10% to about 15%, the chromium has a mass percentage of about 20% to about 35%, and the aluminum has a mass percentage of about 50% to about 70%. In a first exemplary embodiment, the titanium has a mass percentage of about 15%, the chromium has a mass percentage of about 25%, and the aluminum has a mass percentage of about 60%. In a second exemplary embodiment, the titanium has a mass percentage of about 15%, the chromium has a mass percentage of about 20%, and the aluminum has a mass percentage of about 65%. In a third exemplary embodiment, the titanium has a mass percentage of about 10%, the chromium has a mass percentage of about 20%, and the aluminum has a mass percentage of about 70%. The color layer 17 has a thickness ranging from 4 μm to about 6 μm, and is white due to its chemical make-up and thickness. The chromium in the color layer 17 enhances the glossiness of the color layer 17, allowing the color layer 17 and the housing 10 to present an enamel appearance.

Vickers hardness tests have been performed on the housing 10 and the substrate 11. The tests indicated that the substrate 11 had a Vickers hardness of about 250 HV to about 300 HV, while the housing 10 had a Vickers hardness of about 800 HV to about 1000 HV, which is far greater than the Vickers hardness of the substrate 11.

Alternatively, the base layer 13 can be omitted, and the transition layer 15 is directly deposited on the substrate 11.

In the exemplary embodiment, the housing 10 is formed by the following method.

Figure 3:
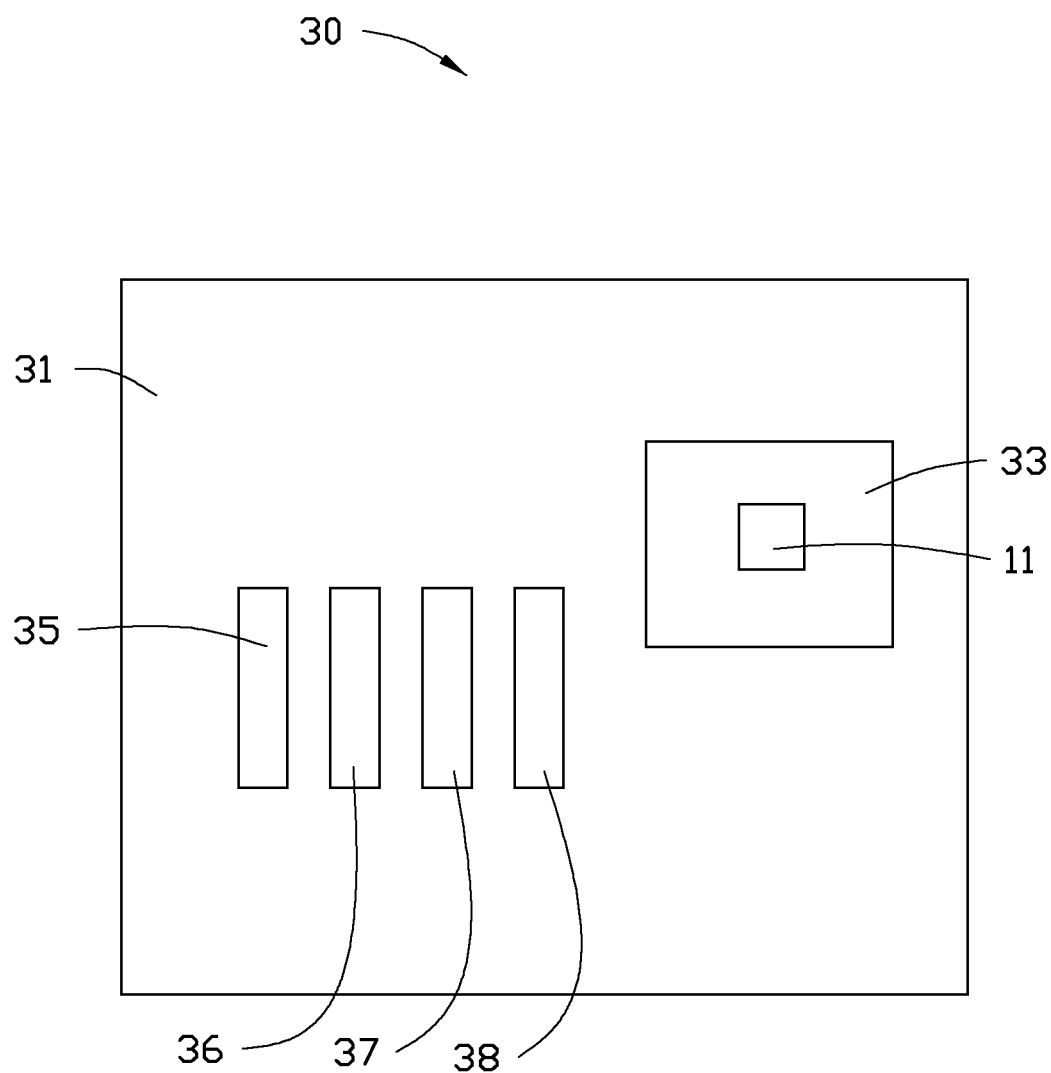
FIG. 3 is a schematic view of a vacuum depositing device in accordance with an exemplary embodiment.

FIG. 3 shows an exemplary vacuum depositing device 30. The vacuum depositing device 30 includes a coating chamber 31, and a fixing element 33, a titanium target 35, a chromium target 36, an iron target 37, and an aluminum target 38 all positioned in the coating chamber 31. The vacuum depositing device 30 may be a magnetron sputtering device, or a multi-arc ion plating device. In the exemplary embodiment, the vacuum depositing device 30 is a multi-arc ion plating device.

The substrate 11 is cleaned in an ultrasonic cleaning device (not shown) filled with absolute ethanol for about 25 min to about 35 min.

The substrate 11 is mounted on the fixing element 33. The coating chamber 31 is evacuated to about $5.0 \times 10^{-3}$ Pa and is heated to about 160° C. to about 200° C. A power of about 3 kW to about 5 kW is applied to the vacuum depositing device 30. Argon gas having a purity of about 99.999% may be used as a working gas and is fed into the coating chamber 31 at a flow rate of about 600 standard-state cubic centimeters per minute (sccm) to about 800 sccm. The argon gas is ionized to plasma. The plasma strikes the surface of the substrate 11 to clean the surface of the substrate 11. Plasma cleaning the substrate 11 may take about 15 min to about 20 min. The targets in the coating chamber 31 are unaffected by the plasma cleaning process.

The base layer 13 is deposited on the pretreated substrate 11. The titanium target 35, the chromium target 36, or the iron target 37 is selected. A bias voltage of about −300 V to about −350 V is applied to the substrate 11. Argon gas may be used as a working gas and is fed into the coating chamber 31 at a flow rate of about 100 sccm to about 150 sccm. Depositing of the base layer 13 may take about 8 min to about 15 min.

The transition layer 15 is deposited on the base layer 13. The titanium target 35 and chromium target 36, the titanium target 35 and iron target 37, or the titanium target 35 and aluminum target 38 are selected. A bias voltage of about −200 V to about −250 V is applied to the substrate 11. Argon gas may be used as a working gas and is fed into the coating chamber 31 at a flow rate of about 100 sccm to about 150 sccm. Nitrogen ($N_2$) and acetylene ($C_2H_2$) are used as reaction gases and are fed into the coating chamber 31. The $N_2$ has a flow rate of about 20 sccm to about 40 sccm. The $C_2H_2$ has a flow rate of about 15 sccm to about 30 sccm. Depositing of the transition layer 15 may take about 25 min to about 45 min.

The color layer 17 is deposited on the transition layer 15. The titanium target 35, the chromium target 36, and the aluminum target 38 are selected. A bias voltage of about −250 V to about −300 V is applied to the substrate 11. Argon gas may be used as a working gas and is fed into the coating chamber 31 at a flow rate of about 150 sccm to about 200 sccm. Depositing of the color layer 17 may take about 50 min to about 80 min.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A housing, comprising:
a substrate;
a transition layer disposed on the substrate; and
a color layer disposed on the transition layer;
wherein the transition layer is a mixing coating layer of metal carbonitride, the metal comprises titanium and one of which selected from the group consisting of aluminum, chromium, and iron;
wherein the color layer is a titanium-chromium-aluminum layer.

2. The housing as claimed in claim 1, wherein the transition layer has a thickness of about 1 μm to about 4 μm.

3. The housing as claimed in claim 1, wherein the color layer comprises titanium having a mass percentage of about 10% to about 15%, chromium having a mass percentage of about 20% to about 35%, and aluminum having a mass percentage of about 50% to about 70%.

4. The housing as claimed in claim 1, wherein the color layer has a thickness of about 4 μm to about 6 μm.

5. The housing as claimed in claim 1, wherein the housing further comprises a base layer formed between the substrate and the transition layer, the base layer is a metal layer comprising titanium, chromium, or iron, and has a thickness of about 0.5 μm to about 0.8 μm.

6. The housing as claimed in claim 1, wherein the substrate is made of aluminum, aluminum alloy, or stainless steel.

7. The housing as claimed in claim 1, wherein the mixing coating layer of metal carbonitride comprises titanium carbonitride and aluminum carbonitride, titanium carbonitride and chromium carbonitride, or titanium carbonitride and iron carbonitride.

8. The housing as claimed in claim 7, wherein when the mixing coating layer of metal carbonitride comprises titanium carbonitride and aluminum carbonitride, the titanium carbonitride has a mass percentage of about 60% to about 80%, the aluminum carbonitride has a mass percentage of about 20% to about 40%.

9. The housing as claimed in claim 7, wherein when the mixing coating layer of metal carbonitride comprises titanium carbonitride and chromium carbonitride, the titanium carbonitride has a mass percentage of about 60% to about 80%, the chromium carbonitride has a mass percentage of about 20% to about 40%.

10. The housing as claimed in claim 7, wherein when the mixing coating layer of metal carbonitride comprises titanium carbonitride and iron carbonitride, the titanium carbonitride has a mass percentage of about 60% to about 80%, the iron carbonitride has a mass percentage of about 20% to about 40%.

11. An electronic device, comprising:
a main body; and
a housing configured to assemble with the main body, the housing comprising:
a substrate;
a transition layer disposed on the substrate; and
a color layer disposed on the transition layer;
wherein the transition layer is a mixing coating layer of metal carbonitride, the metal comprises titanium and one of which selected from the group consisting of aluminum, chromium, and iron;
wherein the color layer is a titanium-chromium-aluminum layer.

12. The electronic device as claimed in claim 11, wherein the transition layer has a thickness of about 1 μm to about 4 μm.

13. The electronic device as claimed in claim 11, wherein the color layer comprises titanium having a mass percentage of about 10% to about 15%, chromium having a mass percentage of about 20% to about 35%, and aluminum having a mass percentage of about 50% to about 70%.

14. The electronic device as claimed in claim 11, wherein the color layer has a thickness of about 4 μm to about 6 μm.

15. The electronic device as claimed in claim 11, wherein the housing further comprises a base layer formed between the substrate and the transition layer, the base layer is a metal layer comprising titanium, chromium, or iron, and has a thickness of about 0.5 μm to about 0.8 μm.

16. The electronic device as claimed in claim 11, wherein the substrate is made of aluminum, aluminum alloy, or stainless steel.

17. The electronic device as claimed in claim 11, wherein the mixing coating layer of metal carbonitride comprises titanium carbonitride and aluminum carbonitride, titanium carbonitride and chromium carbonitride, or titanium carbonitride and iron carbonitride.

18. The electronic device as claimed in claim 17, wherein when the mixing coating layer of metal carbonitride comprises titanium carbonitride and aluminum carbonitride, the titanium carbonitride has a mass percentage of about 60% to about 80%, the aluminum carbonitride has a mass percentage of about 20% to about 40%.

19. The electronic device as claimed in claim 17, wherein when the mixing coating layer of metal carbonitride comprises titanium carbonitride and chromium carbonitride, the titanium carbonitride has a mass percentage of about 60% to about 80%, the chromium carbonitride has a mass percentage of about 20% to about 40%.

20. The electronic device as claimed in claim 17, wherein when the mixing coating layer of metal carbonitride comprises titanium carbonitride and iron carbonitride, the titanium carbonitride has a mass percentage of about 60% to about 80%, the iron carbonitride has a mass percentage of about 20% to about 40%.

\* \* \* \* \*